United States Patent [19]

Yamauchi et al.

[11] Patent Number: 5,192,719
[45] Date of Patent: Mar. 9, 1993

[54] METHOD OF PRODUCING HIGH-STRENGTH β-TYPE SILICON CARBIDE SINTERED BODIES

[75] Inventors: Hidetoshi Yamauchi, Gifu; Haruhisa Hasegawa; Yasuji Hiramatsu, both of Ohgaki, all of Japan

[73] Assignee: Ibiden Co., Ltd., Japan

[21] Appl. No.: 768,337

[22] Filed: Sep. 30, 1991

Related U.S. Application Data

[63] Continuation of Ser. No. 298,887, Jan. 11, 1989, abandoned.

[51] Int. Cl.$^5$ ............................................. C04B 35/56
[52] U.S. Cl. ......................................... 501/88; 501/90
[58] Field of Search ...................... 501/88, 90, 92, 93

[56] References Cited

U.S. PATENT DOCUMENTS

| | | | |
|---|---|---|---|
| 4,004,934 | 1/1977 | Prochazka | 106/44 |
| 4,342,837 | 8/1982 | Suzuki et al. | 501/90 |
| 4,502,983 | 3/1985 | Omori et al. | 501/88 X |
| 4,579,704 | 4/1986 | Tanaka et al. | 264/65 |
| 4,853,299 | 8/1989 | Mizutani et al. | 428/698 |

FOREIGN PATENT DOCUMENTS 52-6716   1/1977   Japan.
60-186467 3/1984   Japan.

OTHER PUBLICATIONS

Hara et al., Silicon Carbide Sintered Bodies and Their Method of Preparation, Mar. 1984: translation.

*Primary Examiner*—Karl Group
*Attorney, Agent, or Firm*—Parkhurst, Wendel & Rossi

[57] ABSTRACT

A high-density and high-strength β-type silicon carbide sintered body, in which crystal grains are made uniform and fine by adjusting the compounding ratio of the sintering aid and further taking a special means at the sintering step while suppressing the inclusion of α-SiC into the starting powder as far as possible during the production of the silicon carbide sintered body.

2 Claims, 3 Drawing Sheets

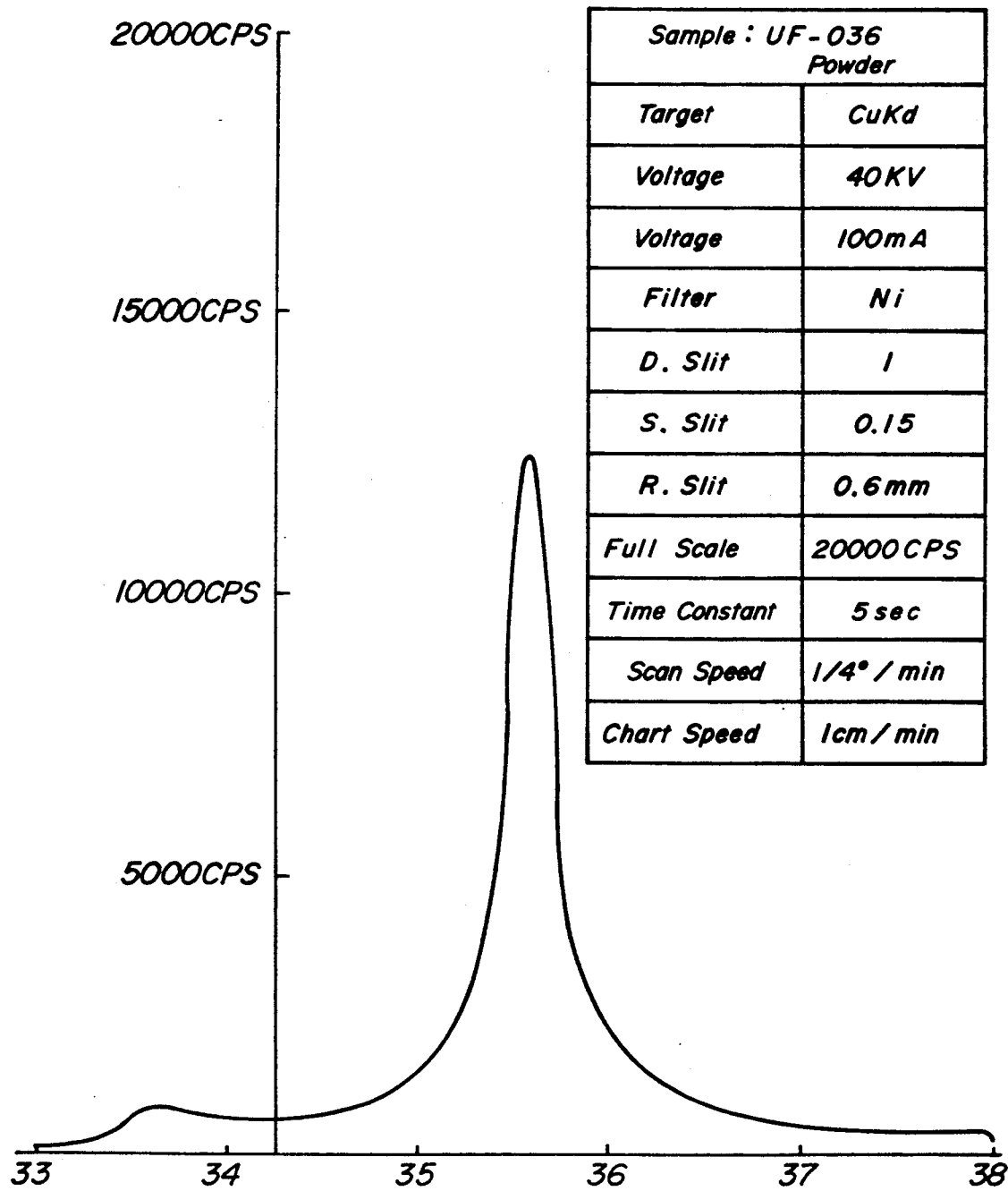
FIG_1

FIG_2
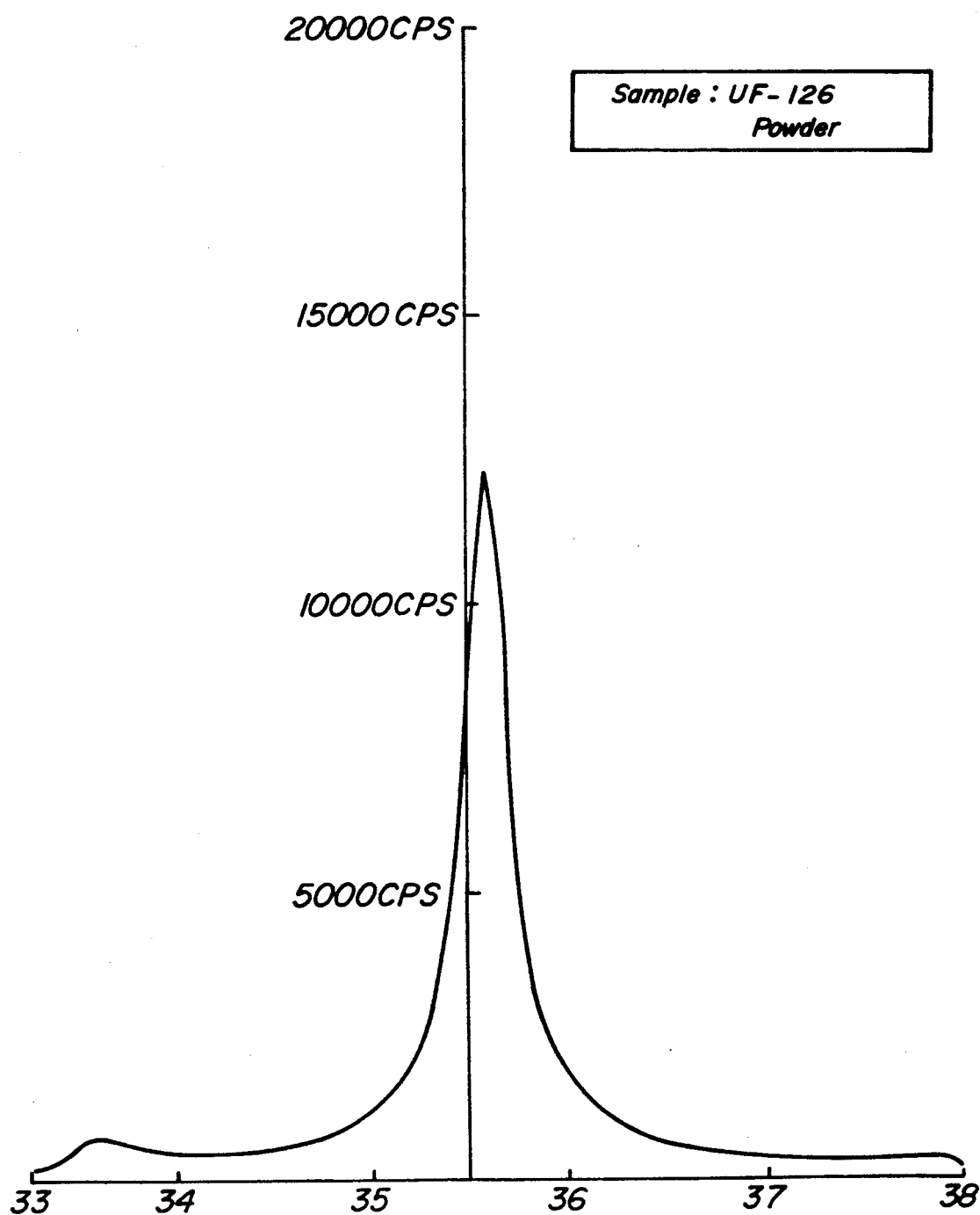

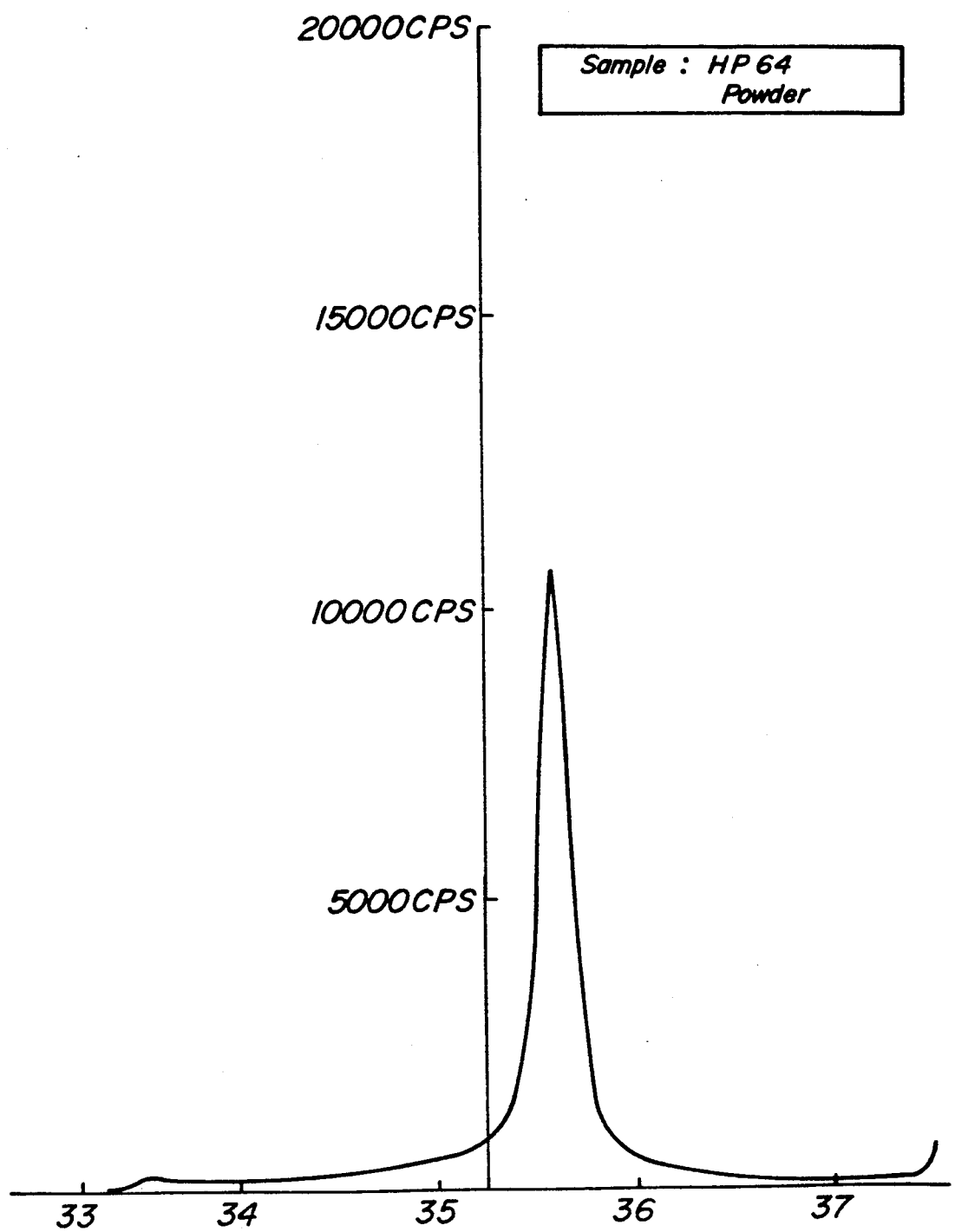
FIG_3

METHOD OF PRODUCING HIGH-STRENGTH β-TYPE SILICON CARBIDE SINTERED BODIES

This is a continuation of application Ser. No. 07/298,887 filed Jan. 11, 1989, now abandoned.

TECHNICAL FIELD

This invention relates to high-strength β-type silicon carbide sintered bodies and a method of producing the same.

Such β-type silicon carbide sintered bodies are useful as a ceramic adaptable for use in high-temperature structural members requiring heat resistance, corrosion resistance, abrasion resistance and the like such as gas turbines and engine parts.

BACKGROUND ART

As regards a technique for the production of high-density, high-strength silicon carbide sintered bodies, there have hitherto been proposed a method described in Japanese Patent Application Publication No. 57-32,035 in which β-type silicon carbide (hereinafter abbreviated as "β-SiC") powder is used as a starting material and fired together with a B compound and a C compound as a sintering aid, a method of using α-type silicon carbide (hereinafter abbreviated as "α-SiC") powder as a starting material as described in Japanese Patent Application Publication No. 58-14,390, and the like.

In the case of the aforementioned conventional techniques, high density is realized, but the control of β→α transformation and the control of crystal grain growth at the firing stage are insufficient and. Hence the strength of the resulting sintered body is insufficient for putting into practical use.

DISCLOSURE OF INVENTION

The invention has been developed under the above circumferences and is to establish a technique for the production of β-SiC sintered bodies having high density and high strength in which the crystal composition of the sintered body is substantially β phase.

The feature and construction of the invention is as follows:

A first embodiment of the invention relates to a high-strength β-type silicon carbide sintered body containing B: 0.1~2.0 wt % and C: 1.0~5.0 wt % and having a crystal grain size of not more than 15 μm and a density corresponding to not less than 95% of theoretical density and a content of α-type crystals of not more than 5 vol %.

A second embodiment of the invention relates to a method of producing a high-strength β-type silicon carbide sintered body, characterized in that β-type silicon carbide powder containing not more than 5 vol % of α-type is added with an elementary boron or a boron compound in an amount of 0.1~2.0 wt % as a boron content and an elementary carbon or a carbon compound in an amount of 1.0~5.0 wt % as a carbon content and mixed under a condition that an inclusion ratio of metal purity and α-type silicon carbide is controlled to not more than 0.1 wt %, and the resulting mixed starting material is shaped and then sintered under a vacuum or in a non-oxidizing atmosphere.

A third embodiment of the invention relates to a method of producing a high-strength β-type silicon carbide sintered body, characterized in that pure β-type silicon carbide powder is added with an elementary boron or a boron compound in an amount of 0.1~2.0 wt % as a boron content and an elementary carbon or a carbon compound in an amount of 1.0~5.0 wt % as a carbon content, and the resulting mixed starting material is shaped and then sintered under a vacuum or in a non-oxidizing atmosphere.

A fourth embodiment of the invention relates to a method of producing a high-strength cubic silicon carbide sintered body, characterized in that fine powder mainly consisting of β-type silicon carbide powder is used as a starting material and shaped, and the resulting shaped body is heated within a temperature range of 1,200°~1,600° C. under a vacuum or in a non-oxidizing atmosphere for 1~3 hours and then heated up to a sintering temperature of not lower than 1,900° C. while raising the temperature at a rate of 0.3°~2.5° C./min in a chemically inert atmosphere, and thereafter held at a given sintering temperature (fourth invention).

The reason why the composition and properties of the β-type sintered body are limited as mentioned above will be explained below.

① Reasons why α-phase in the sintered body is limited to not more than 5 vol %:

In α-SiC crystals, the crystalline structure is a hexagonal system or a rhombohedral system and the thermal expansion coefficient is dependent upon the crystal orientation, so that in a sintered body containing a large amount of α-SiC, a residual stress based on the difference of thermal expansion coefficient is produced, thus it is difficult to obtain a high strength. and (b) When β-SiC crystal phase is transformed into α-SiC crystal phase, coarse crystals of not less than 100 μm are likely to grow. The stress concentrates in these coarse crystals cause a decrease in strength, so that the a-phase should be restricted to not more than 5 vol %.

② Reason why the average crystal grain size is limited to not more than 15 μm:

When the average crystal grain size of the sintered body exceeds 15 μm, a stress concentration is caused in each of the crystal grains to thereby cause a decrease in strength. As is preferably not more than 10 μm on average, and the maximum grain size being not more than 30 μm.

③ Reason why the remaining B as a sintering aid is limited to 0.1~2.0 wt %:

When B is less than 0.1 wt %, B is difficult to be uniformly distributed over all the SiC powder and the uniform growth of crystal grains is obstructed, so a sintered body having a high density is not obtained. On the other hand, when the remaining amount of B is more than 2.0 wt %, density becomes high, but coarse crystal grains produced due to the nonuniform growth of crystal grains to provide a β-SiC sintered body having a high α-SiC content. Though this cause is not clear, it is considered that when B is existent in an amount of more than 2.0 wt %, the excessive B is unevenly distributed and there is a great difference in the grain growth rate between SiC particles at the unevenly distributed portion and SiC particles at the non-distributed portion. The more preferable range is about 0.15~0.28 wt %.

As the B source added as a sintering aid in the sintering, use may be made of elemental boron, boron carbide, boron nitride and organoboron compounds. When using boron, boron carbide and boron nitride, it is preferable to have an average particle size of not more than 10 μm, particularly it is favorable to have an average particle size of not more than 1 μm and a specific surface area of not less than 5 m²/g.

(4) Reason why the remaining C as a sintering aid is limited to 1.0~5.0 wt %:

There are many reports on the action of C at the sintering stage of SiC through the pressureless sintering process. According to the inventors' study, it has been elucidated that such C controls the growth of SiC particles and prevents the formation of coarse grains to conduct uniform grain growth.

However, when C is less than 1.0 wt %, it is difficult to stably obtain the high-density sintered body. Also, the growth of crystal grains becomes nonuniform and the content of α-SiC phase becomes high. On the other hand, when C is more than 5.0 wt %, a high-density sintered body is not obtained. Also, the oxidation resistance lowers. Therefore, in order to uniformly grow SiC particles and control the α-SiC content to not more than 5 vol %, the C amount should be 1.0~5.0 wt %. The more preferable range is 1.5~3.0 wt %.

As the C source added as a sintering aid, use may be made of fine powder of solid-like carbon such as carbon black, acetylene black, coke or the like; and compounds producing carbon through thermal decomposition such as phenolic resins, acrylic resins, ethylcellulose or the like. When using the solid-like carbon, it is desirable to have an average particle size of not more than 1 μm, and is more preferable to have a size of not more than 0.1 μm and a specific surface area of not less than 30 m²/g.

The production method of the β-SiC sintered body according to the second embodiment will now be explained.

As a starting material, β-SiC powder should be used to have an α-SiC content of not more than 5 vol %, since because α-SiC is a high-temperature type of SiC crystals and hardly transforms from α to β of low-temperature type in the firing. Therefore, considering that the α-phase in the sintered body should be not more than 5 vol %, the upper limit in the starting material is naturally not more than 5 vol %, and more preferably not more than 1.0 vol %.

As the β-SiC powder used herein, use may be made of powders synthesized by reduction of silica, direct reaction between Si and C, CVD reaction between SiCl₄ and CH₄, thermal decomposition of polycarbosilane and the like. As the preferable properties of this powder, the average particle size is not more than 1.0 μm, the specific surface area is not less than 5 m²/g, the oxygen content is not more than 1.0 wt %, and the content of metal impurities other than Si is not more than 0.2 wt % in total.

Then, boron (B) and carbon (C) and, if necessary, a solvent are added and mixed with the above β-SiC. The resulting mixture must be uniformly mixed, dried and shaped under a condition that the inclusion of a metal impurity and α-SiC is not more than 0.1 wt %.

When the metal impurity exceeds 0.1 wt %, the concentration of metal impurity in the mixture becomes high, and the abnormal grain growth and formation of α-SiC are caused during the sintering. This cause differs in accordance with the kind of metal, but is considered due to the fact that the presence of metal forms the liquid phase of low melting point or accelerates the diffusion of Si or C. The term "metal impurity" used herein means metals other than Si bonding to C as SiC.

When α-SiC powder is included into the starting material in an amount of more than 0.1 wt %, the amount of α-SiC included in the resulting sintered body becomes very large, since the included α-SiC acts as a nucleus to cause the rapid transformation of β-SiC to α-SiC.

As previously mentioned, the inclusion of a metal impurity and α-SiC is likely to be caused at the mixing, drying and shaping steps. Particularly, the metal impurity would likely be included from a mixer used in the mixing step. When the mixer is made from a SiC sintered body containing an α-type phase, the inclusion of α-SiC occurs.

In order to prevent the inclusion of these metal impurities and α-SiC, it is preferable to use a mixer made from an organic material having a very small metal impurity, such as nylon, Teflon, vinyl resin or the like.

In the mixing and shaping, steps the sintering aid such as B, C or the like are particularly necessary to be uniformly mixed with β-SiC powder, since, when the mixing is nonuniform, the action of B or C becomes nonuniform and the uniform growth in the sintering is impossible and the coarse grains or α-type grains are produced. In order to satisfy this requirement, a ball mill, oscillation mill or the like is used, and in this case, it is further preferable to use a solvent such as water, alcohol, benzene, acetone or the like.

Then, the shaped body is sintered at a maximum temperature of preferably 1,950°~2,150° C. under a vacuum or in a non-oxidizing atmosphere.

Thus, β-type silicon carbide sintered bodies having high density and strength are obtained. If α-SiC is existent in a slight amount, the satisfactory effect of improving the strength might not be obtained due to this fact. Therefore, it is advantageous to eliminate the α-SiC in order to stably realize the improvement of the strength of the β-type silicon-carbide sintered bodies as much as possible.

In this connection, the inventors have made further studies and accomplished the third embodiment.

The progress of the third embodiment and the concrete contents of the means for solving the above subject matter, particularly the condition of mixed starting material will be explained below.

In general, it is very difficult to sinter β-SiC into a homogeneous and fine microstructure by subjecting it to a heat treatment. Further, it is likely to cause abnormal grain growth during transformation into α-SiC when the sintering temperature is raised for high densification. The abnormal growth of crystal grains is likely to make defects in the sintered body, resulting in the reduction of the strength of the sintered body. Furthermore, since α-SiC has an anisotropy, it is likely to leave a residual strain in the sintered body, resulting in the lowering of the strength of the sintered body. For these reasons, the sintered body is preferable to have a homogeneous and fine microstructure of β-SiC containing no α-SiC. However, even when the density of the resulting conventional sintered body is not less than 95% of theoretical density, the sintered body having a crystalline phase of about 100% β-SiC is not obtained.

In this point, the inventors have made various studies and considered that the β→α transformation of crystal phase in the sintering is due to not only the fact that α-SiC is stable at a high temperature but also the presence of metal impurities such as Fe, Al and the like contained in the powder. Therefore, the inventors have made further studies with respect to this point and found that there are existent SiC powder easily causing the transformation and SiC powder hardly causing the transformation.

That is, when the powder easily causing the transformation was observed by means of a transmission type electron microscope, an electron beam diffraction pattern of 6H type SiC was recognized. However, when the powder hardly causing the transformation was observed in the same manner, a clear diffraction pattern of β-SiC or a streak diffraction pattern of β-SiC was only recognized, and the diffraction pattern of α-SiC was not recognized. Further, when both powders were observed by X-ray diffractometry, there was recognized no diffraction pattern of α-SiC such as 6H, 15R, 4H or the like.

From the above, the inventors have anticipated that the transformation is accelerated by a slight amount of α-SiC crystals existent in β-SiC powder.

Now, the inventors have aimed at the use of pure β-SiC powder containing no α-SiC crystals of 4H, 6H, 15R or the like as a starting material, and made various experiments and obtain sintered bodies having a density corresponding to not less than 90% of theoretical density and a β-SiC content of not less than 95%.

Further, boron (B) is used as a sintering aid for such a pure β-SiC powder starting material. The addition amount of B is suitable within a range of 0.1~2.0 wt %. Preferably, it is 0.1~0.3 wt T. When the addition amount of B is less than 0.1 wt % or more than 2.0 wt %, the given density of the sintered body is not obtained. Moreover, carbon (C) is used as the other sintering aid for the starting material, wherein the addition amount of C is suitable within a range of 1.0~5.0 wt %. Preferably, it is 2.0~3.0 wt %. When the addition amount of C is less than 1.0 wt % or more than 5.0 wt %, the given density is not obtained.

Moreover, as the β-SiC powder usable in the invention, an example of powder produced by the silica reduction process is preferable to have the following:
F-SiO$_2$: not more than 0.4%, F-C: not more than 0.65%,
T-Fe: not more than 0.08%, T-Al: not more than 0.08%,
T-Ca: not more than 0.08%, H$_2$O: not more than 0.70%,
average grain size: not more than 0.3 μm,
submicron ratio: not less than 94%,
maximum grain size: 2 μm, specific surface are: a 15~22 m$^2$/g Then, the starting powder having the above preferable composition is shaped and subjected to a heat treatment. The sintering temperature in this heat treatment is suitably within a range of 1,800°~2,150° C.. When the temperature is lower than 1,800° C., the given density is not obtained, while when it is higher than 2,150° C., the transformation to α-SiC becomes large, the finally required content of β-type crystal phase is not obtained and also the desired strength can not be realized.

Although the above has been described with respect to the means for improving the strength from a viewpoint of the composition of the starting material and the compounding ratio of the sintering aid, the improvement of the strength can be achieved by applying a particular means to the production step of the sintered body.

That is, the fourth embodiment is based on the following knowledge for the sintering mechanism of β-SiC powder, i.e. a knowledge that it is fundamentally effective to control the initial sintering condition at low temperature side as well as the last sintering condition at middle and high temperature sides.

The production conditions specifying the fourth invention, particularly sintering conditions will be described below.

(1) The initial sintering stage of β-SiC powder lies in heating within a temperature range of 1,200°~1,600° C. under a vacuum ($10^{-1}$~$10^{-5}$ Torr) or in an inert gas atmosphere (Ar, N$_2$) for 1~3 hours in order to remove SiO$_2$ and other impurity oxides existent on the surface of the powder, to obtain a uniform sintered body. When the temperature is lower than 1,200° C., the effect is small even under a vacuum, while when it is higher than 1,600° C. under a vacuum, the decomposition of SiC is likely to be caused, resulting in the obstruction of surface densification. In this case, the temperature rising rate is desirable to be within a range of 10°~1.25° C./min.

(2) At the subsequent middle and last sintering stages above 1,600° C., it is necessary to uniformize the shaped body so as not to cause the temperature difference between the surface and the interior thereof. For this purpose, it is effective to control the temperature rising rate to 0.3°~2.5° C./min up to the sintering temperature above 1,900° C.

Thus, when the temperature rising rate at this stage is lower than 0.3° C./min, demerits are caused from a viewpoint of workability and cost, while when it is higher than 2.5° C./min, the crystal grain growth occurs and the transformation to α-type becomes large.

Moreover, at the temperature region above 2,000° C. in the last sintering stage, a vacuum ($10^{-1}$~$10^{-5}$ Torr) is preferable for ensuring the control of β→α transformation. In this case, the reprecipitation of evaporated SiC is prevented and the formation of α-nucleus is suppressed at high temperature.

(3) In the cooling from the sintering temperature (maximum temperature), it is preferable that the cooling rate is maintained within a range of 0.3°~5° C./min for preventing the β→α transformation.

Upon the production of the SiC sintered body adopting the above mentioned sintering conditions (1) and (2) and if necessary (3), the crystal microstructure of the resulting sintered body is further made uniform and fine as compared with that of the conventional SiC sintered body and the β→α transformation is suppressed to lessen the defects, whereby the β-SiC sintered body having excellent wear resistance and strength is obtained.

BRIEF DESCRIPTION OF THE DRAWINGS

FIG. 1 is an X-ray diffraction chart of the starting powder used in Example 8;

FIG. 2 is an X-ray diffraction chart of the starting powder used in Comparative Example 7; and FIG. 3 is an X-ray diffraction chart of the starting powder used in Comparative Example 8.

DETAILED DESCRIPTION OF THE PREFERRED EMBODIMENTS

EXAMPLES 1~7, COMPARATIVE EXAMPLES 1~6

To β-SiC powder synthesized by the silica reduction process and having composition and properties shown in a~c of Table 1 were added boron carbide having a maximum grain size of not more than 10 μm and a specific surface area of 5 m$^2$/g and resol-type phenolic resin (residual carbon ratio 50%) as a sintering aid in a compounding ratio shown in Table 2, and further 300 parts of water as a solvent was added, which were mixed by means of various mixers shown in Table 2 for a given time. The drying was carried out by means of a spray dryer. The resulting granulates were shaped in a mold at 150 kg/cm$^2$ and then subjected to a rubber press at 3 t/cm$^3$ to obtain a shaped body.

Then, the above shaped body was dried and then fired. The firing was carried out by raising the temperature up to 1,500° C. at a rate of 5° C./min under a vacuum of $1 \times 10^{-2}$ Torr, holding the temperature of 1,500° C. for 1 hour, returning the inside of the furnace to atmospheric pressure with argon gas, raising the temperature up to 2,090° C. at a rate of 1.25° C./min under atmospheric pressure while flowing argon gas at a rate of 5 l/min into the furnace, holding this temperature for about 1 hour and then cooling.

In the resulting sintered body, the density was measured by an Archimedes' method and the three-point flexural strength was measured according to a method of JIS R1601. Further, a Kawamura's equation was applied to the quantitative determination of polymorphism because only peaks of 3C and 6H were recognized in the X-ray diffraction pattern (conditions for X-ray diffraction were voltage: 40 kV, current: 100 mA, $2\theta$: 32°~42°, scan speed: ¼°/min, time constant: 5 sec., chart speed: 1 cm/min, full scale: 20,000 cps., provided that there was a weak unknown peak at $2\theta = 33.6°$ in the X-ray diffraction patterns of powder and sintered body).

The measured properties of the sintered body are shown in the following Table 2.

was always maintained by flowing argon gas at a rate of 5 l/min under atmospheric pressure.

The thus obtained sintered body had a density of 98%, an α-type content of 4 vol % and a flexural strength of 71.0 kgf/mm$^2$.

EXAMPLE 8

β-SiC powder synthesized by the silica reduction method as shown in the following Table 3 was used as a starting material. This powder had an X-ray diffraction pattern as shown in FIG. 1. To 100 parts by weight of this β-SiC powder were added 0.32 parts by weight of boron carbide (B$_4$C) having a maximum grain size of not more than 10 μm and a specific surface area of 5 m$^2$/g and 4.0 parts by weight of resol-type phenolic resin (residual carbon ratio 50%) as a sintering aid and 300 parts by weight of water as a solvent, which were mixed in a polyethylene container of a 3 l capacity filled with about 60% by volume of Teflon balls for 24 hours. The drying was carried out by means of a spray dryer. The thus obtained granulates were shaped in a mold under a pressure of 150 kg/cm$^2$ and then shaped by means of a rubber press at 3 t/cm$^2$.

The shaped body was dried and then subjected to a heat treatment (sintering). The sintering was carried out by raising the temperature up to 1,500° C. at a rate of 5° C./min under a vacuum of $1 \times 10^{-2}$ Torr and holding the temperature of 1,500° C. for 1 hour. Thereafter, the inside of the furnace was rendered into atmospheric pressure with argon gas, and the temperature was raised up to 2,090° C. at a rate of 1.25° C./min under atmo-

TABLE 1

| | Chemical composition | | | | Powder properties | | | |
|---|---|---|---|---|---|---|---|---|
| No. | F. SiO$_2$ (wt %) | F. C (wt %) | Al (wt %) | Fe (wt %) | average grain size (μm) | submicron content (%) | specific surface area (m$^2$/g) | α-type content (vol %) |
| a | 0.30 | 0.42 | 0.05 | 0.06 | 0.28 | 95.5 | 18.9 | 0 |
| b | 0.70 | 0.26 | 0.02 | 0.02 | — | — | 52.2 | 0 |
| c | 0.33 | 0.40 | 0.03 | 0.07 | 0.29 | 96.1 | 18.2 | 5.1 |

TABLE 2

| | Production conditions | | | | | Sintered body | | | |
|---|---|---|---|---|---|---|---|---|---|
| | β-SiC | Addition amount of sintering aid | | Mixing | | Sintering temperature | Density | α-type content | Flexural strength |
| No. | powder | B (wt %) | C (wt %) | means | time (H) | (°C.) | (%) | (vol %) | (kgf/mm$^2$) |
| Example 1 | a | 0.25 | 2.0 | Teflon ball mill | 24 | 2090 | 98 | 2.3 | 77.0 |
| 2 | a | 0.2 | 2.0 | Teflon ball mill | 24 | 2090 | 97 | 0 | 72.1 |
| 3 | a | 0.25 | 4.0 | Teflon ball mill | 24 | 2090 | 98 | 1.6 | 75.1 |
| 4 | a | 0.3 | 5.0 | Teflon ball mill | 24 | 2120 | 99 | 5.0 | 70.6 |
| 5 | a | 0.15 | 1.5 | Teflon ball mill | 24 | 2090 | 96 | 1.5 | 65.2 |
| 6 | a | 0.2 | 2.0 | nylon attritor | 20 | 2060 | 98 | 2.1 | 78.0 |
| 7 | b | 0.28 | 2.0 | nylon attritor | 20 | 1950 | 96 | 0 | 66.0 |
| Comparative Example 1 | a | 0.05 | 2.0 | Teflon ball mill | 24 | 2090 | 85 | 3.3 | 38.0 |
| 2 | a | 0.2 | 2.0 | agate mortar | 1 | 2090 | 96 | 7.7 | 47.5 |
| 3 | a | 0.7 | 0.5 | stainless attritor | 20 | 2090 | 99 | 10.0 | 56.6 |
| 4 | a | 0.7 | 3.0 | stainless attritor | 20 | 2150 | 99 | 16.0 | 45.9 |
| 5 | a | 0.15 | 2.5 | SiC ball mill | 24 | 2070 | 95 | 35.0 | 44.0 |
| 6 | c | 0.2 | 2.0 | Teflon ball mill | 24 | 2090 | 98 | 41.0 | 42.2 |

Moreover, as regards an example adopting the same compounding recipe and shaping condition as in Example 1, the shaped body was dried at 100° C., directly heated from room temperature to 2,090° C. at a temperature rising rate of 5° C./min, held at this temperature for 1 hour and then cooled. In this case, the atmosphere spheric pressure while flowing argon gas at a rate of 5 l/min and held at 2,090° C. for 1 hour and then cooled.

The properties of the thus obtained sintered body are shown in the following Table 4. The measurement of these properties were the same as in Examples 1~7.

TABLE 3

| | Starting (β-SiC) powder | | | | | | |
|---|---|---|---|---|---|---|---|
| F. SiO$_2$ | F. C | T. Al | T. Fe | Average grain size | Submicron content | Specific surface area | α-type content |
| 0.03% | 0.42% | 0.05% | 0.06% | 0.28 μm | 95.5% | 18.9 cm$^2$/g | 0 vol % |

TABLE 4

| Density of sintered body | | 3.15 g/cm$^3$ |
|---|---|---|
| Crystal size | average | 3~5 μm |
| | maximum | 7~10 μm |
| Polymorphism composition | β | 100 vol % |
| | α | 0 |
| Average flexural strength | | 77.0 kgf/mm$^2$ |

EXAMPLE 9

The same shaped body as in Example 8 was raised up to 2,090° C. at a temperature rising rate of 5° C./min in an Ar atmosphere and held at this temperature for 1 hour and then cooled. When the properties of the thus obtained sintered body were measured, the density was 3.14 g/cm$^3$, and α-SiC content was 3.7 vol % and β-SiC content was 96.3 vol %. As the crystal size, the average grain size was 5~8 μm and the maximum grain size was 10~15 μm. The average strength of the sintered body was 69.8 kg/mm$^2$.

COMPARATIVE EXAMPLE 7

There was provided SiC powder as shown in the following Table 5, in which the presence of α-SiC crystal phase was confirmed, among β-SiC powder synthesized by the same silica reduction method as in Example 8. The chart of this powder through X-ray diffraction was shown in FIG. 2. This β-SiC powder containing α-phase was fired in the same manner as in the above example to produce the sintered body.

The thus obtained sintered body had a density of 3.14 g/cm$^3$ and contained 15% of α-SiC and 85% of β-SiC. The average grain size as a crystal size was 10~15 μm, the maximum grain size was 50 μm, and the average strength was 55.4 kgf/mm$^2$.

TABLE 5

| F. SiO$_2$ | F. C | T. Fe | T. Al | Average grain size | Specific surface area |
|---|---|---|---|---|---|
| 0.36% | 0.49% | 0.05% | 0.03% | 0.28 μm | 18.7 cm$^2$/g |

COMPARATIVE EXAMPLE 8

β-SiC powder synthesized by the same silica reduction method as in Example 8 and containing α-SiC crystal confirmed by X-ray diffraction was sintered in the same manner as in Example 8 to obtain a sintered body. This sintered body had a density of 3.15 g/cm$^3$ and contained 60% of α-SiC and 40% of β-SiC. The crystal size was an average grain size of 10~15 μm and a maximum grain size of 300 μm, and the average strength was 48.6 kgf/mm$^2$.

Moreover, the chart of the starting material through X-ray diffraction is shown in FIG. 3.

COMPARATIVE EXAMPLE 9

The same β-SiC powder as in Example 8 was separately added with 3 wt % of α-SiC (A-1, made by Showa Denko K. K.), which were sintered in the same manner as in Example 8 to obtain a sintered body. This sintered body had a density of 3.12 g/cm$^3$ and contained 50% of α-SiC and 50% of β-SiC.

EXAMPLES 10~18

99.68 wt % of β-SiC powder having an average grain size of 0.27 μm as a starting material and 0.32 wt % of B$_4$C as a sintering aid were used. To this mixture were added 4.0 wt % (outer amount) of phenolic resin and 300 wt % (outer amount) of benzene, which were placed in a ball mill and mixed for 24 hours, and then dried by means of a spray dryer. The thus obtained granulates were shaped in a mold and rubber pressed at 3 t/cm$^2$. Then, the shaped body was dried at 100° C. and sintered.

As shown in the following Table 6, the sintering was carried out by raising the temperature up to 1,500° C. at a rate of 5° C./min in an Ar gas atmosphere or under a vacuum, holding the temperature of 1,500° C. for 1 hour, purging with Ar gas, raising the temperature up to 2,090° C. at a rate of 0.3°~1.25° C./min while flowing Ar gas at a rate of 5 l/min, holding this temperature for 1 hour and then cooling at a rate of 2.5° C./min.

Moreover, the effect when changing the inside from Ar gas to vacuum at a temperature region above 2,000° C. was examined to obtain results as shown in the following Table 7. Also, the effect of the cooling rate was examined to obtain results as shown in the following Table 8.

TABLE 6

| | Sintering conditions | | | | | | Density of sintered body *1 (g/cm$^3$) | Average crystal grain size (μm) | Maximum crystal grain size (μm) | Crystal composition *2 (vol %) | | | Three-point flexural strength *3 (kgf/mm$^2$) |
|---|---|---|---|---|---|---|---|---|---|---|---|---|---|
| | low temperature side | | | high temperature side | | | | | | | | | |
| | temperature (°C.) | rising rate (°C./min) | atmosphere (Torr) | temperature (°C.) | rising rate (°C./min) | atmosphere (Torr) | | | | 3C | 6H | 4H | |
| Example 10 | 1500 | 5 | 10$^{-2}$ | 2090 | 1.25 | Ar | 3.15 | 3~5 | 7~10 | 97.7 | 2.3 | 0 | 77.0 |
| Example 11 | 1500 | 5 | 10$^{-2}$ | 2090 | 0.3 | Ar | 3.15 | 5~7 | 10~12 | 96.8 | 3.2 | 0 | 70.5 |
| Example 12 | 1500 | 5 | Ar | 2090 | 1.25 | Ar | 3.14 | 5~7 | 10~12 | 97.5 | 3.5 | 0 | 72.0 |
| Example 13 | 1500 | 5 | 10$^{-2}$ | 2090 | 5 | 10$^{-2}$ | 3.13 | 5~7 | 10~12 | 99.0 | 1.0 | 0 | 78.2 |
| Example 14 | 1500 | 5 | 10$^{-2}$ | 2090 | 1.25 | 10$^{-2}$ | 3.13 | 3~5 | 7~10 | 100 | 0 | 0 | 81.0 |
| Example 15 | 1500 | 5 | 10$^{-2}$ | 2090 | 5 | 10$^{-2}$ | 3.13 | 2~4 | 6~8 | 100 | 0 | 0 | 82.5 |

*1 Density of sintered body: Archimedes' method
*2 Crystal composition: Quantitative determination of crystal form is measured according to Kawamura's method from peak strength through X-ray diffraction.
*3 Three-point flexural strength: according to a method of JIS R1601

TABLE 7

| | Sintering conditions | | | Density of sintered body *1 ($g/cm^3$) | Average crystal grain size ($\mu m$) | Maximum crystal grain size ($\mu m$) | Crystal composition *2 (vol %) | | | Three-point flexural strength *3 ($kgf/mm^2$) |
|---|---|---|---|---|---|---|---|---|---|---|
| | temperature (°C.) | rising rate (°C./min) | atmosphere (Torr) | | | | 3C | 6H | 4H | |
| | | | Effect under vacuum above 2,000° C. | | | | | | | |
| Example 16 | 2,090 | 1.25 | Ar up to 2,000° C., $10^{-2}$ above 2,000° C. | 3.15 | 3~5 | 7~10 | 99.0 | 1.0 | 0 | 78.5 |

*1~*3: same as described above

TABLE 8

| | Sintering conditions | | | | Density of sintered body *1 ($g/cm^3$) | Average crystal grain size ($\mu m$) | Maximum crystal grain size ($\mu m$) | Crystal composition *2 (vol %) | | | Three-point flexural strength *3 ($kgf/mm^2$) |
|---|---|---|---|---|---|---|---|---|---|---|---|
| | temperature (°C.) | rising rate (°C./min) | cooling rate (°C./min) | atmosphere | | | | 3C | 6H | 4H | |
| | | | Effect under cooling condition | | | | | | | | |
| Example 17 | 2,090 | 1.25 | 25 | Ar | 3.15 | 3~5 | 7~10 | 97.5 | 2.5 | 0 | 73.0 |
| Example 18 | 2,090 | 1.25 | 5 | Ar | 3.15 | 3~5 | 6~8 | 99.0 | 1.0 | 0 | 79.0 |

*1~*3: same as described above

Comparative Examples 10~13

The same β-SiC powder and sintering aid as in Example 10 were used, and the temperature was directly raised up to the sintering temperature at a rate of 0.1°~10° C./min without dividing only the firing conditions on the temperature raising and the holding of heating temperature into two stages as a comparative example, and the properties of the thus obtained sintered body under the above conditions are shown in the following Table 9.

As seen from the results of the above examples and comparative examples, according to the production method of the invention, SiC sintered bodies having a high strength ($\geq 70$ kgf/cm²), a uniform and fine crystal microstructure and a low α-formation ratio are obtained.

members requiring not only high strength but also heat resistance, corrosion resistance, wear resistance and the like.

We claim:

1. A method of producing a high-strength β-type silicon carbide sintered body, comprising the following steps:
   combining starting materials of β-type silicon carbide powder, elemental boron or a boron-containing compound in an amount of 0.1-2.0 wt % in boron, and elemental carbon or a carbon-containing compound in an amount of 1.0-5.0 wt % in carbon;
   forming the starting materials into a shaped body; and
   heating the shaped body within a temperature range of 1200°-1600° C. in a non-oxidizing atmosphere for 1-3 hours and then to a sintering temperature of not lower than 1900° C. at a rate of 0.3°-2.5° C./min in a non-oxidizing atmosphere, and thereafter holding the shaped body at the sintering temperature.

2. The method of claim 1 wherein the sintering temperature is 1,950°~2,150° C.

TABLE 9

| | Sintering conditions | | | Density of sintered body ($g/cm^3$) | Average crystal grain size ($\mu m$) | Maximum crystal grain size ($\mu m$) | Polymorphism composition (vol %) | | | Three-point flexural strength ($kgf/mm^2$) |
|---|---|---|---|---|---|---|---|---|---|---|
| | temperature (°C.) | rising rate (°C./min) | atmosphere | | | | 3C | 6H | 4H | |
| Comparative Example 10 | 2150 | 1.25 | Ar | 3.16 | 10~15 | 300 | 79.2 | 18.0 | 2.8 | 46.0 |
| Comparative Example 11 | 2090 | 10 | Ar | 3.13 | 10~15 | 100 | 93.0 | 7.0 | 0 | 52.3 |
| Comparative Example 12 | 2090 | 5 | Ar | 3.14 | 7~10 | 20~30 | 93.7 | 6.3 | 0 | 57.3 |
| Comparative Example 13 | 2090 | 0.1 | Ar | 3.13 | 7~10 | 30~50 | 91.4 | 8.6 | 0 | 54.8 |

INDUSTRIAL APPLICABILITY

According to the invention, β-SiC sintered bodies having a uniform and fine crystal microstructure and a high strength can easily be obtained, which are advantageously adaptable for use in high-temperature structural